United States Patent [19]

Noda

[11] Patent Number: 5,356,840
[45] Date of Patent: Oct. 18, 1994

[54] DISTRIBUTED INDEX OF REFRACTION TYPE OPTICAL ELEMENT AND METHOD OF MAKING THE SAME

[75] Inventor: Satoshi Noda, Akishima, Japan

[73] Assignee: Olympus Optical Co., Ltd., Tokyo, Japan

[21] Appl. No.: 12,785

[22] Filed: Feb. 2, 1993

Related U.S. Application Data

[63] Continuation-in-part of Ser. No. 844,935, Mar. 4, 1992, abandoned, which is a continuation-in-part of Ser. No. 569,902, Aug. 20, 1990, abandoned.

[30] Foreign Application Priority Data

Aug. 21, 1989 [JP] Japan .................. 1-214733

[51] Int. Cl.$^5$ .............................................. C03C 3/00
[52] U.S. Cl. ........................................ 501/12; 65/30.13
[58] Field of Search ................ 501/12, 37; 65/3.14, 65/3.15, 3.13, 30.13; 350/413

[56] References Cited

U.S. PATENT DOCUMENTS

| | | | |
|---|---|---|---|
| 3,894,857 | 7/1975 | Uchida | 65/3.14 X |
| 4,686,195 | 8/1987 | Yamane | 501/12 |
| 4,755,039 | 7/1988 | Hattori | 350/413 |
| 4,797,376 | 1/1989 | Caldwell | 501/12 |
| 4,851,024 | 7/1989 | Sakai | 65/3.14 |
| 4,902,330 | 2/1990 | Sakai | 65/30.13 |

FOREIGN PATENT DOCUMENTS 59-41934 10/1984 Japan.
380133 4/1991 Japan.

OTHER PUBLICATIONS

Electronics Letters vol. 22 No. 21, Oct. 1986.
Mukherjee, "Gradient Index Lens Fabrication Processes; A Review", Topical Meeting on Gradient-Index Optical Imaging Systems, May 4–5, 1981, pp. 1–5.

*Primary Examiner*—Mark L. Bell
*Assistant Examiner*—A. Wright
*Attorney, Agent, or Firm*—Cushman, Darby & Cushman

[57] ABSTRACT

The distributed index of refraction type optical element consists of an element composing a glass forming oxide and a cation composing a glass modifying oxide, and has therein a distributed index of refraction imparted by a gradient of density of the element and a distributed index of refraction imparted by a gradient of density of the cation which are completely independent of each other. This optical element permits controlling chromatic aberration in various ways and has various favorable optical characteristics. The method of making the optical element comprises a first step for imparting a first distributed index of refraction to a glass body material by forming a gradient of density of the element and a second step for imparting a second distributed index of refraction to the glass body material by forming a gradient of density of the cation.

14 Claims, 3 Drawing Sheets

γd: CONSTANT

IDEAL CONDITION

DISTRIBUTED INDEX OF REFRACTION TYPE OPTICAL ELEMENT AND METHOD OF MAKING THE SAME

This application is a continuation-in-part of U.S. Ser. No. 07/844,935, filed Mar. 4, 1992, now abandoned; which in turn is a continuation-in-part of U.S. Ser. No. 07/569,902, filed Aug. 20, 1990, now abandoned.

BACKGROUND OF THE INVENTION

Field of the Invention

The present invention relates to a distributed index of refraction type optical element and a method of making the same.

Description of the Prior Art

As optical elements indispensable for optical systems to be developed in the next generation, distributed index of refraction type optical elements are now attracting wide attention due to their excellent ability for correcting aberration.

A large number of enterprises and research institutes are studying and developing various distributed index of refraction type optical elements, not to speak of SELFOC (registered trade mark) and Slab lenses which have already been offered for sale.

The distributed index of refraction type optical element has a refractive power of its medium proper which is imparted by the index of refraction distributed in the medium. The power is determined dependently on the distributed index of refraction and enhanced by increasing a difference between gradients of the indices of refraction (herein after referred to as $\Delta n$). Accordingly, an important task now imposed on researchers of distributed index of refraction type optical elements is to increase $\Delta n$ and investigations are being made by many researchers to try to increase $\Delta n$.

Under the present circumstances, most approaches are made in the area of developing distributed index of refraction type optical elements having increased $\Delta$'s and large outside diameters, whereas attempts to reduce chromatic aberration in optical elements are retarded. Moreover, the distributed index of refraction type optical elements posses the possibility of remarkably reducing the number of lens elements owing to the excellent capability for correction of aberration, but such produces a contradiction in that the correction of chromatic aberration becomes more difficult as the number of lens elements is reduced. In order to compose a lens system comprising a distributed index of refraction type optical elements and having sufficiently corrected chromatic aberration, it may therefore be necessary to adopt a means such as use of an achromatic lens, thereby reducing the merit of the distributed index of refraction type optical elements. In order to compose a lens system in which the chromatic aberration is corrected with a small number of lens elements, it is impotant to reduce the chromatic aberration to be produced by each of the lens elements. For this purpose, the distributed index of refraction type optical element must be made of a medium having a characteristic ranging from the high index of refraction-low dispersion region to the low index of refraction-high dispersion region. In case of a radially distributed index of refraction type optical element, the index of refraction of the medium is varied and rays are refracted differently dependenting on height of rays (distance from the optical axis). Assuming now that a medium has a constant Abbe's number $(\nu_d=(n_d-1)/(n_F-n_c))$, the portion having a high index of refraction refracts a ray more largely than the portion having a low index of refraction, thereby allowing the ray to be dispersed more largely due to the difference in wavelength as illustrated in FIG. 1A. In other words, the chromatic aberration $(n_F-n_c)$ becomes more remarkable as index of refraction $n_d$ is higher when Abbe's number is kept constant. In order to reduce the chromatic aberration $(n_F-n_c)$, it is therefore desirable that Abbe's number $\nu_d$ is large for the portion having the high index of refraction as shown in FIG. 1B. That is to say, it is desirable that a meduim has a charateristic varying from the high index of refraction-low dispersion region to the low index of refraction-high dispersion region. In case of the axially distributed index of refraction type optical element, on the other hand, it is considered that the conclusion obtained for the general achromatic cemented lens (doublet) shown in FIG. 2A or FIG. 2B is applicable. Since the cementing between the lens made of a medium having the high index of refraction and the lens made of a medium having the low index of refraction is realized by distributing index of refraction in a medium of a single lens as illustrated in FIG. 2C or FIG. 2D, it is desirable that the axially distributed index of refraction type optical element, like the radially distributed index of refraction type optical element, has a characteristic varing from the high index of refraction-low dispersion region to the low index of refraction-high dispersion region. Describing this characteristic with reference to the $n_d-\nu_d$ graph illustrated in FIG. 3, the optical characteristic varying in the direction A is more excellent for correction of chromatic aberration than the characteristic varying in the direction B (See Japanese Patent Preliminary Publication No. Sho 60-218614). Further, as the distribution in the direction A in FIG. 3 has an indication closer to the horizontal direction, the chromatic aberration is not only reduced but also produced in the negative side. This is a phenomenon which cannot be observed in the ordinary glass material and an optical element exhibiting this phenomenon has an excellent capability to cancel the chromatic aberration produced by the other lenses. It is also possible, needless to say, to make an optical element which produces no chromatic aberration by properly setting the inclination.

However, most of the distributed index of refraction type optical elements now available are designed for increased $\Delta n$'s and have smaller Abbe's number at the portion having higher indices of refraction. That is to say, most of the distributed index of refraction type optical elements have the characteristic varying in the direction B shown in FIG. 3. Speaking concretely of the ion-exchange method, for example, which imparts a gradient of density or concentration by ion-exchange between $Tl^+$, a univalent ion adopted into glass as a component to compose a glass modifying oxide (having no direct relation to formation of glass) for increasing $\Delta n$, and $Na^+$ or $K^+$, the use of $Tl^+$ allows an increase $\Delta n$ but makes the Abbe's number have a characteristic varying from the high index of refraction-high dispersion region to the low index of refraction-low dispersion region, thereby allowing chromatic aberration to be produced remarkably. Further, ion-exchange between $Ag^+$ and $Na^+$ increases $\Delta n$ but allows chromatic aberration to be produced remarkably. Furthermore, certain examples remarkably improve the correction of chromatic aberration by utilizing $Li^+$ but decrease $\Delta n$ on the other hand and do not exhibit the effects thereof sufficiently. Speaking more concretely, enhancement in content of Li+ is effective to increase Δn but have not attained to levels yet to exhibit sufficient effects in practice since enhancement in content of Li+ is allowable only within a limited range from the viewpoint of the chemical resistance of glass body materials and due to technical difficulty to dissolve a volatile alkali component stably into glass body materials. Since the ion-exchange method allows bivalent and higher-valent ions to be exchanged at very slow speeds and is substantially usable for imparting gradients of density of univalent cation only, the method allows the gradients of ion density, or concentration for imparting distributed indices of refraction to be varied only within a strictly limited range and does not permit obtaining a distributed index of refraction type optical element having a large Δn and producing little chromatic aberration. Moreover, distributed index of refraction type optical elements are being developed by the sol-gel method. There is a method to impart a gradient of density, or concentration by eluting a metal element such as Ti, Ge or Zr which enhances index of refraction and composes a glass forming oxide (a substance originally contained for forming glass) from a wet gel by using an acid or a similar chemical. Though this method permits obtaining Δn which is large to a certain extent, the distributed index of refraction type optical element prepared by this method has an Abbe's number characteristic varying from the high index of refraction-high dispersion region to the low index of refraction-low dispersion, and allows remarkable production of chromatic aberration, which is similar to the characteristic of the distributed index of refraction type optical element obtained by the Tl+⇌Na+ type ion-exchange.

SUMMARY OF THE INVENTION

In view of the problems described above, it is a primary object of the present invention to provide a distributed index of refraction type optical element which has Δn large enough for practical use, an Abbe's number characteristic varying from the high index of refraction-low dispersion region to the low index of refraction-high dispersion region and other various characteristics including little chromatic aberration, as well as a method of making the same.

The distributed index of refraction type optical element according to the present invention is characterized in that the distributed index of refraction formed by a gradient of density, or concentration, of an element composing a glass forming oxide and distributed index of refraction formed by a gradient of density, or concentration, of a cation composing a glass modifying oxide are present in the same optical element, and that both of said distributions of index of refraction are independent of each other.

Further, the method for making the distributed index of refraction type optical element according to the present invention is characterized in that it comprises a first step to form a first distributed index of refraction in a glass body material by imparting a gradient of density, or concentration, of an element composing a glass forming oxide of a glass body material, and a second step to form a second distributed index of refraction in the glass body material by imparting a gradient of density, or concentration, of a cation composing a glass modifying oxide of the glass body material, and is further characterized in that said second step is carried out by an ion-exchange method to immerse the glass body material formed at said first step into a melted salt containing at least one kind of univalent cation.

The present invention enhances flexibility for material designs and provides numerous variation of distributed index of refraction by imparting independent distributions to glass forming oxides and cations composing glass modifying oxides respectively. The present invention makes it easy to obtain, for example, glass materials having large Δn's as well as those utilizing the terms of higher orders. The present invention especially makes it possible to obtain distributed index of refraction type optical elements which have excellent chromatic aberration characteristics, i.e., Abbe's numbers varying in the direction from the high index of refraction-low dispersion region to the low index of refraction-high dispersion region, and Δ's convenient for practical use by selecting concave and convex distributions for two components having high indices of refraction and using Tl+ or $Ag^{30}$ as the metal ion composing a glass modifying oxide.

This and other objects as well as the features and the advantages of the present invention will become apparent from the following detailed description of the preferred embodiments when taken in conjunction with the accompanying drawings.

DESCRIPTION OF THE PREFERRED EMBODIMENTS

Figure 1A:
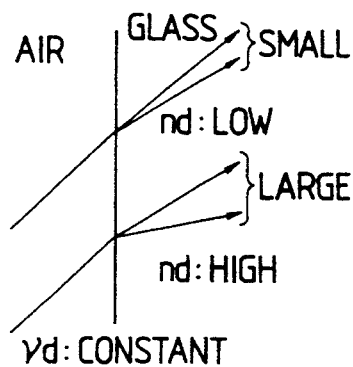
FIG. 1A and FIG. 1B are diagrams illustrating dispersed conditions of rays which are variable dependently on variations of index of refraction and Abbe's number of a glass material.
Figure 1B:
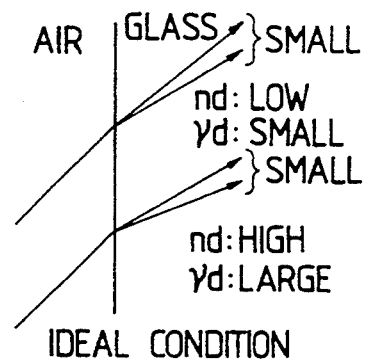
Figure 2A:
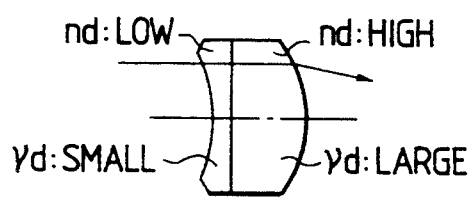
FIGS. 2A, 2B, 2C, and 2D are sectional views illustrating the principle of achromatic cemented doublets.
Figure 2B:
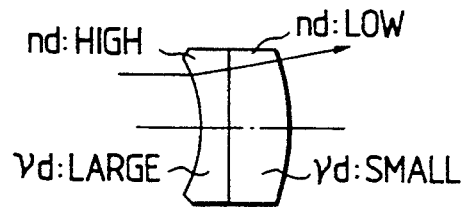
Figure 2C:
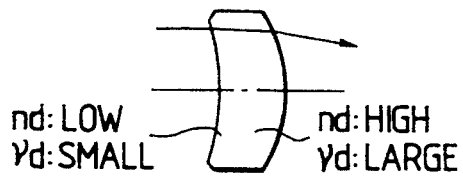
Figure 2D:
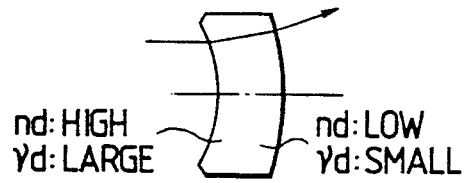
Figure 3:
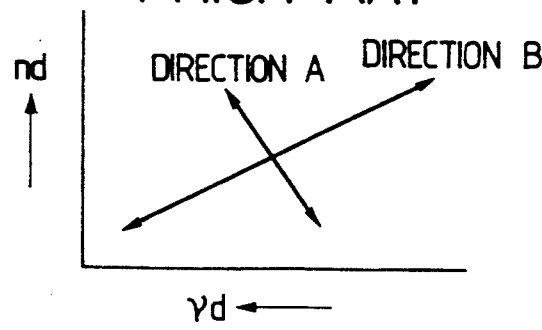
FIG. 3 is a graph illustrating a desirable relation and an undesirable relation between index of refraction and Abbe's number of a distributed index of refraction type optical element.

Prior to description of the preferred embodiments, results of the fundamental experiments carried out by the inventor will be explained below. In the first place, the inventor prepared, by the sol-gel method, a glass body material which had a gradient of density, or concentration, of a bivalent metallic element which contributes greatly to index of refraction. Then, independent of the gradient of density, or concentration, of the bivalent metallic element, a gradient of density, or concentration, of a univalent ion such as $Tl^{30}$ was imparted to the glass body material, for example, by the ion-exchange method. The combination of the sol-gel method and the ion-exchange enabled to obtain a distributed index of refraction type optical element which had a difference of gradient of index of refraction Δn large enough for practical use and an excellent chromatic aberration characteristic. In imparting a gradient of density, or concentration, of a metallic element and a gradient of ion density which are independent of each other through the two steps described above, only the density, or concentration, of the metallic element or ion to have the gradient of density, or concentration, must be varied and the density of the other metallic element or ion must be fixed at each step. After making various examinations, the inventor noticed a fact that the ion-exchange method allows only univalent ions to be exchanged while giving no influence on the bivalent or higher-valent metallic elements which are kept at substantially fixed conditions, and decided to adopt a technique to perform exchange of a univalent ion in a glass material already having a gradient of density, or concentration, of a metallic element which is not a univalent ion. That is to say, the inventor selected the sol-gel method for the first step where a gradient of density of a metallic element which is not a univalent ion is to be imparted and a univalent ion is adopted into a glass body material to be subjected to the ion-exchange at the subsequent second step. Further, the inventor found that the element composing the glass forming oxides are suited as the elements which can produce gradients of density, or concentration, at the first step without hindering the exchange of the univalent ions at the ion-exchange step.

On the basis of these findings, the inventor obtained glass body materials by the sol-gel method at the first step by imparting gradients of density, or concentration, of metallic elements which are the components of the glass forming oxides and can vary indices of refraction, for example, Ti, Nb and Ge, forming gel materials uniformly containing univalent ions such as $Na^+$, $K^+$, $Tl^+$, $Cs^+$, $Li^+$, $Rb^+$ and $Ag^+$, drying and sintering the gel materials. Though these materials are, needless to say, usable as distributed index of refraction type optical elements, independent gradients of density, or concentration, of said univalent ions were imparted to the glass body materials by immersing the materials for ion exchange into melted salts containing other univalent ions. By the steps described above, the inventor obtained distributed index of refraction type optical elements composed of glass body materials which had gradients of density, or concentration, of the elements composing the glass forming oxides (imparted by the sol-gel method at the first step) and independent gradients of density of the cations composing the glass modifying oxides (imparted by the ion exchange at the second step).

The metallic elements constituting the glass forming oxides are available in Ti, Zr, Ge, Nb, Ta, La, Y, Ba, Ca, Zn, Cd, Ga, Sn, Sr, Pb, Th and Mg. For the univalent cations constituting the glass modifying oxides, two elements chosen from among Tl, Cs, Li, Na, K, Rb and Ag can be used as a pair.

Figure 4A:
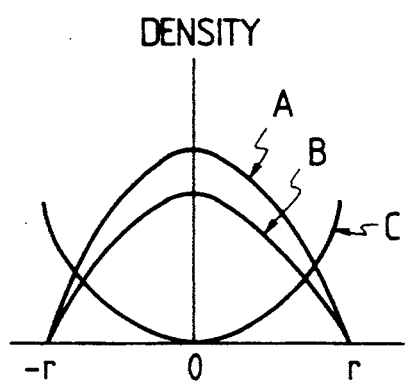
FIGS. 4A, 4B, FIGS. 5A, 5B, and FIGS. 6A, 6B are graphs illustrating density, or concentration, distributions of a metallic element and metal ion imparted at various steps of the making method of the distributed index of refraction type optical element according to the present invention and curves illustrating distributions of index of refraction in the optical element obtained by said method.
Figure 4B:
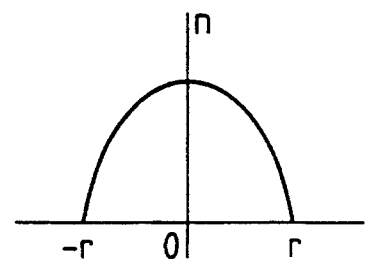
Figure 5A:
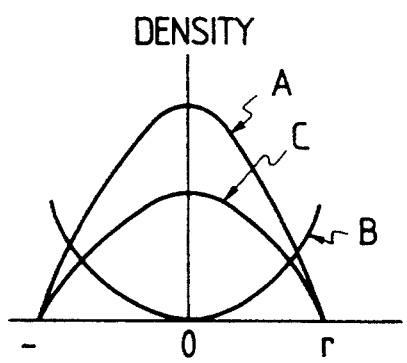
Figure 5B:
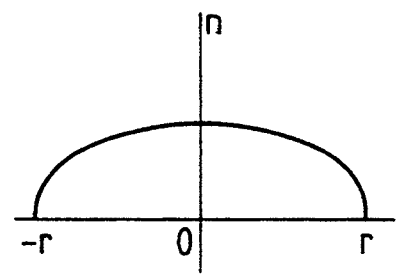
Figure 6A:
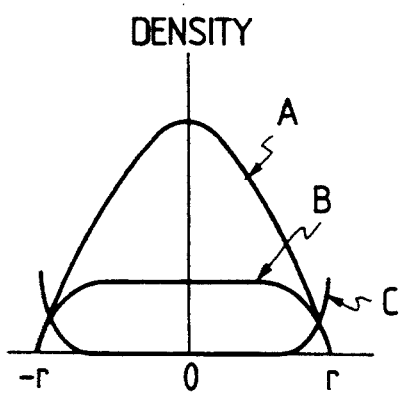
Figure 6B:
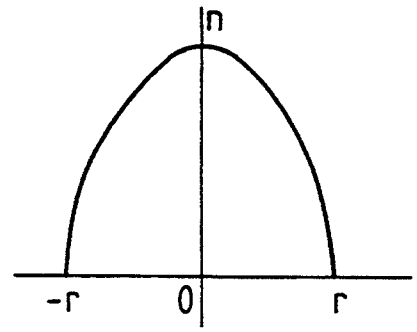

The distributed index of refraction type optical elements can have various characteristics by varying combinations and amounts of the components used for imparting the gradients of density, or concentration. For example, by imparting a gradient of density, or concentration, A of a metallic element a which largely contributes to index of refraction at the first step and imparting a gradient of density, or concentration, B of metallic ion b which also greatly contributes to index of refraction in the same direction as A as shown in FIG. 4A, the obtained distributed index of refraction type optical element had a very large Δn which is equal to the total sum of Δn given by the metallic element a and that given by the metallic ion b as shown in FIG. 4B. In FIG. 4A, the reference symbol C represents the gradient of density, or concentration, of a metallic ion newly adopted by the ion exchange and the reference symbol r designates the radius of the optical element. Further, by imparting gradients A and B of density, or concentration, of metallic elements a and b greatly contributing to index of refraction in the direction reverse to each other as shown in FIG. 5A, the inventor obtained a distributed index of refraction type optical element which has quite a new dispersion characteristic owing to the difference between the dispersion characteristics of the metallic elements a and b. Especially, the inventor found out that an ideal distributed index of refraction type optical element having an excellent chromatic aberration characteristic can be obtained by utilizing these gradients of density, or concentration. In addition, FIG. 5B shows the distributed index of refraction of the optical element which has the gradients of density, or concentration, illustrated in FIG. 5A. Furthermore, as an example of positive utilization of the gradients of density, or concentration, A and B which are independent of each other, the present invention makes it possible to obtain the distributed index of refraction shown in FIG. 6B in which the terms of high orders of the distributed index of refraction imparted at the first step are corrected by stopping the ion exchange in a short time at the second step so as to obtain the gradient of density, or concentration, B shown in FIG. 6A. Especially, when it is desired to obtain a characteristic utilizing the terms of high orders of index of refraction or when aberrations are to be aggravated extremely, it is possible to adequately correct errors in distributed index of refraction at the second step by correcting the terms of high orders. Moreover, it is possible to obtain distributed indices of refraction which are referred to as the W type and M type having inflection points in the course by selecting proper metallic elements and ratios between two gradients of density, or concentration.

By selecting types of metallic elements and adjusting contents thereof so as to control the two gradients of, density or concentration, independently in a single optical element it is possible to impart various types of distributed indices of refraction dependently on the relations between the two gradients of, density or concentration. In addition, non-metallic elements can be used, needless to say, as the elements for imparting the gradients of, density or concentration, at the first step.

Now, the present invention will be described more detailedly with reference to the preferred embodiments illustrated in the accompanying drawings.

EMBODIMENT 1

19.29 ml of Tetramethyl Orthosilicate (TMOS), 13.2 ml of ethanol and 2.45 ml of 2N-hydrochloric acid were mixed in a container, heated to 60° C. and stirred within the container closed with a watch-glass. About one hour later, the heating was stopped to cool the mixture to room temperature. A solution prepared by diluting 11.75 ml of Tetra-n-butyl Orthotitanate with 13.20 ml of Methanol was added slowly to the mixture. While continuing the stirring, a mixture solution of 13.20 ml of Methanol, 17.24 ml of pure water and 9.78 ml of 1N-ammonia water was dripped at a speed of 1 drop/sec.

Figure 7:
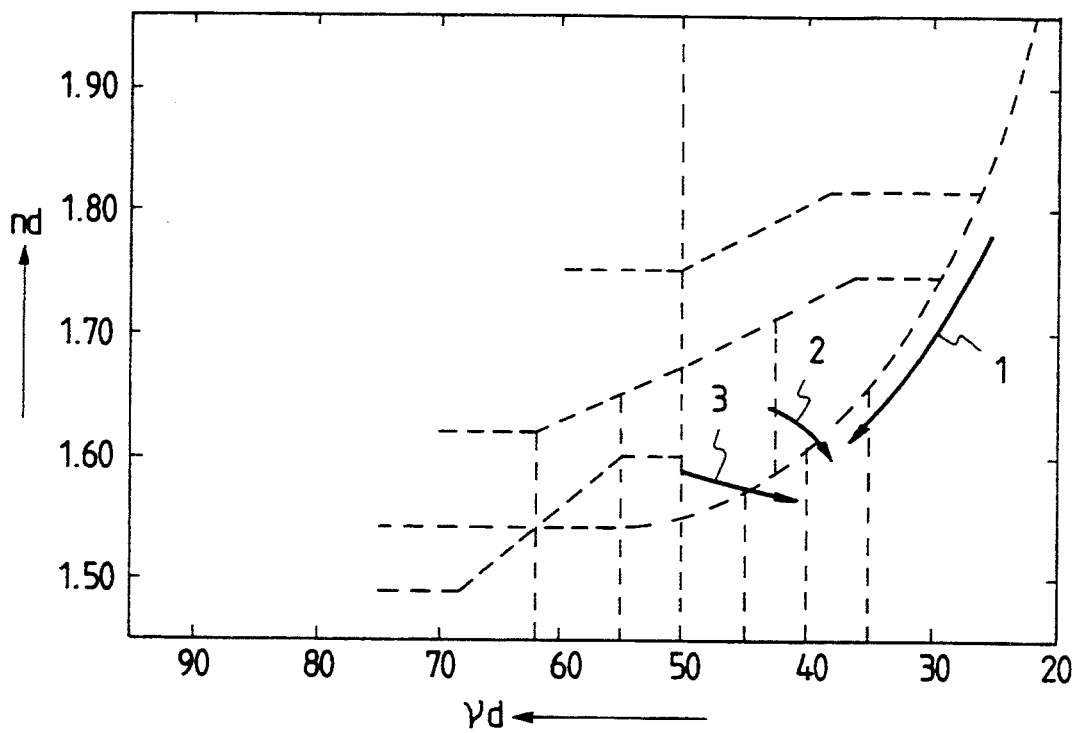
FIG. 7 is a graph illustrating relations between indices of refraction and Abbe's numbers in Embodiments 1 through 3 of the distributed index of refraction type optical element according to the present invention.

After completing the dripping, the mixture was stirred for another one hour at room temperature, flowed into a Teflon tube. When the mixture was kept standing for 24 hours with the Teflon tube closed tightly, it became a gel which was whitely turbid slightly. After aging, the gel was immerged into hydrochloric acid for imparting a gradient of density, or concentration, of Titanium, washed well with Methanol, immerged again into a mixture solution of Thallium-nitrate and Barium nitrate, dried and sintered, whereby a silica type glass body material having a gradient of density, or concentration, of Titanium, and uniformly containing Thallium ion and Barium ion was obtained. By immerging this glass body material into a melted salt containing Sodium nitrate as the main component, the Thallium ion in the glass body material was exchanged with the Sodium ion in the salt. Measurement of the distributed index of refraction of the glass body material indicated that the material was a distributed index of refraction type optical element having $\Delta n = 0.13$ and a maximum index of refraction at the ceter thereof. The distributed index of refraction type optical element had the index of refraction-dispersion relationship indicated by 1 in FIG. 7. Judging from $\Delta n = 0.07$ which was measured before the ion-exchange, the value of $\Delta n$ was enhanced twice as high by the ion exchange. In contrast, a glass body material having no gradient of density, or concentration, of Titanium had $\Delta n = 0.06$ after ion exchange. This comparison experiment indicated that the two gradients of density, or concentration, was effective for increasing $\Delta n$.

EMBODIMENT 2

16.46 ml of Tetramethyl Orthosilicate (TMOS), 19.1 ml of Isopropanol and 1.88 ml of 2N-hydrochloric acid were mixed, heated to 60° C. and stirred for one hour. After the mixture was left cooled to room temperature, a solution prepared by dissolving 4.375g of Niobium penta-Ethoxide into 19.1 ml of Isopropanol was dripped at a speed of 2 drops/sec. Further, a solution prepared by mixing 19.1 ml of Isopropanol, 13.05 ml of pure water and 25 ml of N-ammonia water was dripped slowly so as not to exceed a speed of 1 drop/sec. A fraction of the sol prepared as described above was poured into a Teflon tube having a diameter of 16 mm and kept standing for gelation with the Teflon tube closed tightly. After imparting a gradient of density, or concentration, of Niobium by the same process as that in the Embodiment 1, Sodium was adopted, and the gel was dried and sintered, whereby a glass body material having a diameter a little smaller than 6 mm was obtained. The glass body material was immerged into a melted salt containing a large amount of Thallium nitrate for ion exchange. Measurement of the characteristic of the glass body material thus obtained indicated $\Delta n = 0.04$ and variation of Abbe's number of $\Delta \nu = 6$. The variation was in the direction indicated by 2 in FIG. 7, wherein the high index of refraction-low dispersion region was located at the central portion, and the index of refraction is lowered and Abbe's number was reduced (dispersion was enchanced) toward the marginal portion. This distribution is very effective for correcting chromatic aberration.

EMBODIMENT 3

Into a solution of 12.58 ml of Tetramethyl Orthosilicate and 18.31 ml of N-butanol which were partially hydrolyzed with 11.5 ml of 2N-HCl, a solution prepared by dissolving 5.73 g of Zirconium-n-butoxide into 18.3 ml of N-butanol was dripped, and a mixture liquid of 13.73 ml of N-Butanol, 3.9 ml of N—N Dimethylformamide and 6 ml of 1N-ammonia water was further dripped for gelation. After aging the gel, a gradient of density of Zirconium was imparted, and the gel was immerged into a Methanol solution containing 40% of Sodium Methoxide, dried and sintered, whereby a glass body material was obtained. By immerging the gel into a melted salt containing Thallium nitrate for 165 hours for ion exchange, there was obtained a distributed index of refraction type optical element which had $\Delta n = 0.02$, $\Delta \nu = 10$ and a dispersion characteristic in the direction from the high index of refraction-low dispersion region to the low index of refraction-high dispersion region as indicated by 3 in FIG. 7. It was found that distributed indices of refraction having extremely large $\Delta n$ and excellent chromatic aberration characteristics can be obtained by properly selecting directions, etc. of the two gradients of density, or concentration.

EMBODIMENT 4

Figure 8:
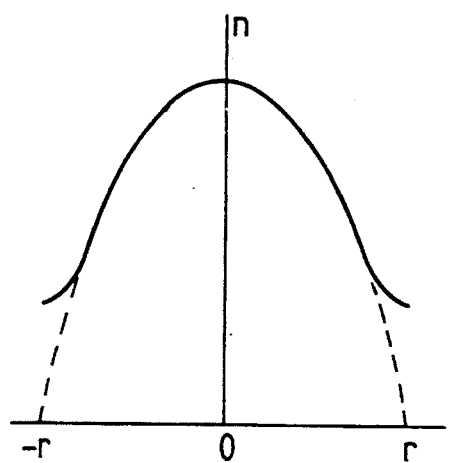
FIG. 8 is a graph illustrating the distribution of index of refraction in the distributed index of refraction type optical element according to the present invention.

The ion exchange was stopped in 15 hours at the second step in the Embodiment 3 and measurement of distributed index of refraction indicated a distribution wherein the index of refraction was a little enhanced or deviated from the parabolic curve only at the outer circumferential portions as illustrated in FIG. 8. The terms of high orders can be controlled as examplified by the Embodiment 4 of the present invention. Since the two gradients of density, or concentration, are completely independent of each other, the present invention makes it possible to provide distributed index of refraction type optical elements having distributed indices of refraction modified at the outer circumferential portions without changing the distributions at the central portions by changing time for the ion exchange and compositions of salts.

What is claimed is:

1. A method for making a gradient index optical glass, comprising the steps of:
   imparting a gradient of concentration to a gel with respect to an element contained therein;
   densifying said gel to a glass; and
   imparting gradients of concentration to said glass produced in said densifying step with respect to univalent cations of another two elements.

2. A method for making a gradient index optical glass, comprising the steps of:
   imparting a gradient of concentration to a gel with respect to an element contained therein;
   introducing univalent ions of another element into said gel;
   densifying said gel into which the univalent ions are being introduced to a glass; and
   imparting a gradient of concentration to said glass produced in said densifying step with respect to said univalent ions contained therein.

3. A method for making a gradient index optical glass, comprising the steps of:
   preparing a gel containing at least bivalent ions of an element as a constituent thereof;
   imparting a gradient of concentration to said gel with respect to said at least bivalent ions contained therein;
   introducing univalent ions of another element into said gel;
   densifying said gel into which said univalent ions are being introduced to a glass; and imparting a gradient of concentration to said glass produced in said densifying step with respect to said univalent ions contained therein.

4. A method for making a gradient index optical glass, comprising the steps of:
   imparting a gradient of concentration to a gel with respect to an element contained therein;
   introducing first univalent ions of another element into said gel;
   densifying said gel into which said first univalent ions are being introduced to a glass; and
   immersing said glass produced in said densifying step in a molten salt containing second univalent ions of still another element, and exchanging the first ions contained in said imparting a gradient of concentration to a gel with respect to an element contained therein;
   introducing first univalent ions of another element into said gel;
   densifying said gel into which said first univalent ions are being introduced to a glass; and
   immersing said glass produced in said densifying step in a molten salt containing second univalent ions of still another element, and exchanging the first ions contained in said glass with said second ions contained in said molten salt to thereby form gradients of concentration of said first and second univalent ions within said glass.

5. A method for making a gradient index optical glass, comprising the steps of:
   preparing a gel containing at least bivalent ions of an element as a constitutent thereof;
   imparting a gradient of concentration to a gel with respect to said at least bivalent ions contained therein;
   introducing first univalent ions of another element into said gel;
   densifying said gel into which said first univalent ions are introduced to a glass; and
   immersing said glass produced in said densifying step in a molten salt containing second univalent ions of still another element, and exchanging the first ions contained in said glass with said second ions contained in said molten salt to thereby form gradients of concentration of said first and second ions within said glass.

6. A method according to claim 2, wherein said step of imparting a gradient of concentration to an element is carried out by a sol-gel method.

7. The method according to claim 3, wherein said step of preparing a gel is carried out by a sol-gel method.

8. The method according to claims 3 or 5, wherein said steps of preparing a gel and of imparting a gradient of concentration to said at least bivalent ion are carried out by a sol-gel method.

9. A gradient index optical glass, comprising:
   a first element selected from the group consisting of titanium, niobium, zirconium and germanium and making up a glass network former oxide; and
   univalent cations of second and third elements selected from the group consisting of sodium, potassium, thallium, cesium, lithium, rubidium and silver and making up respective glass modifier oxides;
   wherein a gradient of concentration of said first element is formed independent of gradients of concentration of said univalent cations of said second and third elements;
   the gradient of concentration of said first element being formed, after imparting the gradient of concentration to a gel with respect to said first element contained therein, by densifying said gel to a glass; and
   the gradients of concentration of said univalent cations of said second and third elements being formed by exchanging univalent cations of said second element contained in said glass produced by densifying said gel with univalent cations of said third element.

10. A gradient index optical glass, comprising:
    an at least bivalent first element selected from the group consisting of titanium, niobium, zirconium and germanium and making up a glass network former oxide; and
    univalent cations of second and third elements selected from the group consisting of sodium, potassium, thallium, cesium, lithium, rubidium and silver and making up respective glass modifier oxides;
    wherein said at least bivalent first element and said univalent cations of said second and third elements each have concentrations varying with positions inside said optical glass
    wherein a gradient of concentration of said at least bivalent first element formed independent of gradients of concentration of said univalent cations of said second and third elements.

11. The gradient index optical glass according to claims 9 or 10, wherein said first element making up the glass network former oxide is titanium and said cations of said second and third elements making up the glass network modifier oxides are sodium and thallium.

12. The gradient index optical glass according to claims 9 or 10, wherein said first element making up the glass network former oxide is niobium and said cations of said second and third elements making up the glass network modifier oxides are sodium and thallium.

13. The gradient index optical glass according to claims 9 or 10, wherein said first element making up the glass network former oxide is zirconium and said cations of said second and third elements making up the glass network modifier oxides are sodium and thallium.

14. A gradient index optical glass comprising:
    at least one element belonging to a first element group, said first element group consisting of titanium, zirconium, germanium, niobium, tantalum, lanthanum, yttrium, barium, calcium, zinc, cadmium, gallium, strontium, tin, lead, thorium and magnesium; and
    univalent cations of another two elements different from each other and belonging to a second element group, said second element group consisting of thallium, cesium, lithium, sodium, potassium, rubidium and silver;
    wherein said at least one element from said first element group and said univalent cations of said two elements from said second element group each have concentrations varying with position inside said optical glass; and
    wherein a gradient of concentration of said at least one element is formed independent of gradients of concentration of said univalent cations of said two elements.

* * * * *